(No Model.)
J. P. QUINETTE.
HAME.
No. 297,846. Patented Apr. 29, 1884.
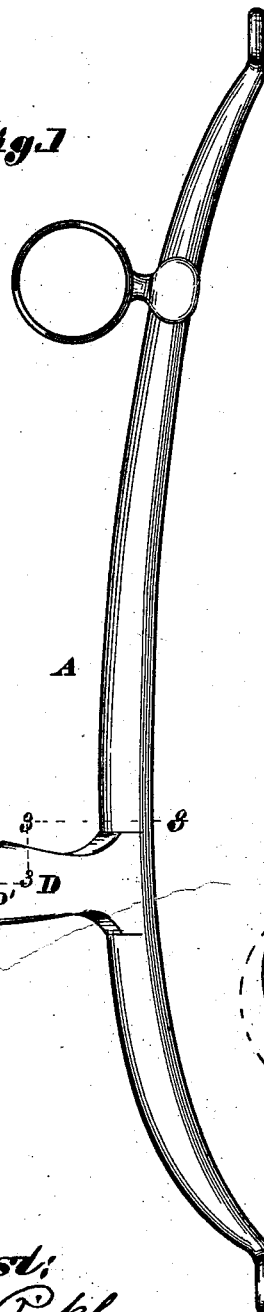
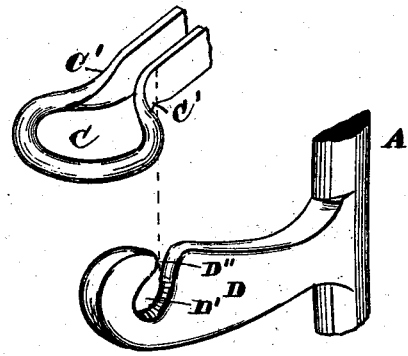
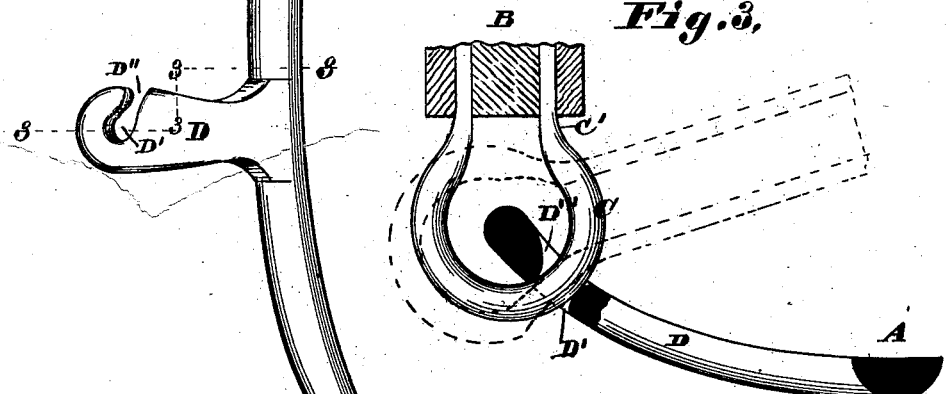
Attest:
Charles Pickle
Wm. J. Sayer
Inventor,
J. P. Quinette
By Knight Bros
Attys

UNITED STATES PATENT OFFICE.

JERMAIN P. QUINETTE, OF ST. LOUIS, MISSOURI.

HAME.

SPECIFICATION forming part of Letters Patent No. 297,846, dated April 29, 1884.

Application filed May 14, 1883. (No model.)

*To all whom it may concern:*

Be it known that I, JERMAIN P. QUINETTE, of the city of St. Louis, in the State of Missouri, have invented a certain new and useful Hame-Hook, of which the following is a specification.

My invention relates to harness hame-hooks constructed in one piece, with the hame adapted to receive the loop of the tug-clip; and my improvement consists in a hame formed with a hook in one piece therewith, having a main opening to fit the loop of the clip, a narrow entrance to admit only a thin portion connecting an arm to the loop of the clip, and a recess on one side of the inside of the main opening, to permit the clip to be swung outward, as hereinafter described, and pointed out in the claim. I will proceed to describe it with reference to the accompanying drawings, in which—

Figure 1 is an elevation of a hame with my improved hook formed in one piece therewith. Fig. 2 is a perspective view of the outer end of a tug-clip and my hook, showing the position of these parts when the tug-clip is to be connected to the hook. Fig. 3 is a section on the line 3 3, Fig. 1, showing the tug-clip connected and securely held, the dotted lines indicating the position of the tug-clip for removal from the hook.

A is a hame.

B is a part of the tug, and C the outer end of a clip secured thereto.

D is my improved hook, formed in one piece with the hame. With this hook the tug-clip engages. The opening D', in the lower part of the hook where the clip-loop rests when in use, is somewhat larger than it is above this point, (see the hook in Figs. 1 and 2,) the upper part, D'', of the opening being considerably smaller than the diameter of the loop of the clip. The only way to insert the hook proper in the eye of the loop is to turn the loop into such a position as to bring the thin portion C' of one of the arms of the clip, as shown in Fig. 2, and in dotted lines in Fig. 3, over the entrance D'', then pass the thin portion through the entrance into the opening, and then, by turning the clip laterally into normal position, the loop of the clip is securely held.

It will be seen that with my improved hook the tug-clip and hame can be easily and quickly connected and disconnected whenever desired, and when in use the parts cannot be disengaged, but are absolutely secure and safe. The tug-clip having to be turned so far around to allow the clip to be disengaged from the hook, there is no possibility of it ever assuming this position when in use. I hollow out or recess the hook at the inside on the tug-side of the opening, as shown at D''', Fig. 3, to permit the tug to be swung outward from the animal's body and from the collar, the point of bearing being between the clip and the hook, inside of the center of the clip, as shown in Fig. 3.

I am aware that a hook having an opening for a loop larger than the entrance thereto is old, broadly considered; but

What I claim as new and of my invention is—

As a new article of manufacture, a hame, having a hook, D, formed in one piece therewith, said hook having a main opening, D', to fit the loop of the tug-clip, a narrow entrance, D'', to the main opening, to admit only a thin portion connecting an arm to the loop of the clip, and a recess, D''', on one side of the inside of the main opening, to permit the clip to be swung outward, as set forth.

JERMAIN P. QUINETTE.

In presence of—
SAML. KNIGHT,
GEO. H. KNIGHT.